(12) United States Patent
Edwards et al.

(10) Patent No.: US 6,449,735 B1
(45) Date of Patent: *Sep. 10, 2002

(54) METHOD AND APPARATUS FOR PROVIDING IMPROVED DIAGNOSTIC FUNCTIONS IN A COMPUTER SYSTEM

(75) Inventors: David A. Edwards, Orangevale; Robert N. Hasbun, Shingle Springs, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/672,983

(22) Filed: Jul. 1, 1996

(51) Int. Cl.[7] .................................................. H02H 3/05
(52) U.S. Cl. ........................................... 714/25; 714/31
(58) Field of Search ....................... 395/183.01, 182.03, 395/183.05, 183.07, 183.13, 183.17, 183.09; 364/267, 267.8; 714/25, 5, 29, 31, 37, 41, 33

(56) References Cited

U.S. PATENT DOCUMENTS

| | | | | |
|---|---|---|---|---|
| 5,023,813 A | * | 6/1991 | Brown, III | 364/519 |
| 5,068,851 A | * | 11/1991 | Bruckert et al. | 395/183.01 |
| 5,179,695 A | * | 1/1993 | Derr et al. | 395/575 |
| 5,235,639 A | * | 8/1993 | Chevalier et al. | 380/4 |
| 5,287,363 A | * | 2/1994 | Wolf et al. | 371/21.1 |
| 5,327,531 A | * | 7/1994 | Bealkowski et al. | 395/182.04 |
| 5,404,288 A | * | 4/1995 | McDunn | 364/140 |
| 5,410,545 A | * | 4/1995 | Porter et al. | 371/21.6 |
| 5,410,707 A | * | 4/1995 | Bell | 395/652 |
| 5,432,802 A | * | 7/1995 | Tsuboi | 371/40.1 |
| 5,491,788 A | * | 2/1996 | Cepulis et al. | 395/182.11 |
| 5,522,076 A | * | 5/1996 | Dewa et al. | 395/700 |
| 5,530,847 A | * | 6/1996 | Schieve et al. | 395/183.14 |
| 5,542,077 A | * | 7/1996 | Johnson et al. | 395/750 |
| 5,544,356 A | * | 8/1996 | Robinson et al. | 707/205 |
| 5,579,522 A | | 11/1996 | Christeson et al. | |
| 5,586,250 A | * | 12/1996 | Carbonneau et al. | 395/183.2 |
| 5,592,616 A | * | 1/1997 | Finch et al. | 395/183.18 |
| 5,592,669 A | * | 1/1997 | Robinson et al. | 707/206 |
| 5,630,049 A | * | 5/1997 | Cardoza et al. | 714/25 |
| 5,671,413 A | | 9/1997 | Shipman et al. | |
| 5,684,741 A | | 11/1997 | Talreja | |
| 5,748,877 A | * | 5/1998 | Dollahite et al. | 395/183.12 |
| 5,774,640 A | * | 6/1998 | Kurio | 714/4 |
| 5,852,736 A | | 12/1998 | Shipman et al. | |
| 6,026,454 A | * | 2/2000 | Hauck et al. | 710/65 |

* cited by examiner

Primary Examiner—Dieu-Minh Le
(74) Attorney, Agent, or Firm—Blakely, Sokoloff, Taylor & Zafman LLP (57) ABSTRACT

A memory module including a flash EEPROM memory array designed to be joined to a memory bus of a computer, BIOS processes including system status test processes stored in the array, diagnostic processes stored in the array to provide data indicating malfunctions in the computer, accessing processes stored in the array for calling the system status test processes and the diagnostic processes even though the computer fails to boot, and communication processes stored in the array for transferring results produced by the system status test processes and the diagnostic processes for use in servicing the computer.

15 Claims, 3 Drawing Sheets

METHOD AND APPARATUS FOR PROVIDING IMPROVED DIAGNOSTIC FUNCTIONS IN A COMPUTER SYSTEM

BACKGROUND OF THE INVENTION

1. Field of the Invention

This invention relates to computer systems and, more particularly, to methods and apparatus for utilizing a flash EEPROM memory array supplementing main memory to provide diagnostic functions.

2. History of the Prior Art

Recently, flash electrically-erasable programmable read-only memory (EEPROM) storage devices have been used in arrays as a new form of long term storage. A flash EEPROM memory array is constructed of a large plurality of floating-gate metal-oxide-silicon field effect transistor devices arranged as memory cells in typical row and column fashion with circuitry for accessing individual cells and placing the memory transistors of those cells into different memory conditions. Such memory transistors may be programmed by storing a charge on the floating gate. This charge remains when power is removed from the array. A charge typically indicates a "zero" or programmed condition, while the absence of a charge indicates a "one" or erased condition. The floating gate condition may be detected when the device is read.

These arrays may be designed to accomplish many of the operations previously accomplished by other forms of memory in digital systems. For example, flash memory is being used to replace various read-only memories such as the basic input/output system (BIOS) memory of a computer system. The ability to program flash memory in place offers substantial advantages over more conventional EPROM memory. More recently, flash memory has been used to provide a smaller lighter functional equivalent of an electromechanical hard disk drive. Flash memory is useful for this purpose because it may be read more rapidly and is not as sensitive to physical damage as an electro-mechanical hard disk drive. Flash hard drive memories are especially useful in portable computers where space is at a premium and weight is extremely important.

However, before flash memory can be used to store rapidly changing data, a number of difficult problems which are related to the design of flash memory must be solved. Typically, a flash memory array is divided into blocks which are connected so that all of the memory cells of an entire block are erased simultaneously. Thereafter, a cell may be individually programmed to store data. Since all of the memory transistors of a block of the array are joined to be erased together, a cell in a programmed condition cannot be switched to the erased state until the entire block of the array is erased. Thus, invalid information cannot be erased without erasing also all of the valid information that remains in the block. The result is that, unlike other memories in which changed data is written (essentially instantaneously) directly in place of the data it replaces, a flash EEPROM memory array requires a time consuming erasure process before it may be rewritten. When the information changes at a data entry in flash memory used to store changing information, the new information is written to a new memory area rather than over the old information; and the old information is marked as invalid. Then, after the block with the old information has filled and a sufficient portion of that block has been marked invalid, all valid information remaining in the block is written to a clean memory area; and the entire block may then be erased, often by a background process.

Intrinsically, flash memory may be read at the same rate as dynamic random access memory (DRAM) manufactured by the same processes so it would seem that flash memory might be used to replace or supplement main memory. However, because the level of charge required to write a flash device is much greater, writing to flash memory takes somewhat longer than writing to DRAM. Moreover, because changed data may not be directly written over invalid data in a block of flash memory but must be written to a new area, the old data invalidated, and the block with invalid data ultimately erased, the average time to write to flash memory is very much longer than to write to DRAM.

Thus, although flash memory has been used for many purposes in computer systems, it has not been used as main memory or a supplement to main memory. The write time for flash memory has been considered to be too long to allow the use of flash memory as a part of main memory.

There are a number of reasons to utilize flash memory at least as a supplement to main memory in a computer system. Data placed in flash EEPROM memory does not require a refresh cycle nor expend power for such a cycle. Since data placed in flash memory is not lost when power is removed from the system, processes which are normally stored in read only memory such as the basic input/output start-up (BIOS) processes could be placed in flash memory on the main memory bus to provide very rapid start-up. The BIOS processes are now typically stored in flash EEPROM or EPROM memory on what is referred to as the X bus, an adjunct to the Industry Standard Association (ISA) bus, in an Intel-processor-based system. When power is applied to a computer, the BIOS processes in the flash read-only memory on the X bus are read and transferred via the ISA bus (or other secondary bus), an ISA/PCI bridge, the PCI bus, and a PCI-to-processor/memory bridge to main memory. Eliminating the transfer of the BIOS processes to main memory would provide rapid system start-up. Moreover, there would be no need to shadow the BIOS processes in DRAM main memory so the portion of main memory typically used for that purpose would be unnecessary.

Placing BIOS processes in a flash EEPROM memory array which resides on the memory bus as a supplement to main memory would also offer another significant advantage. The BIOS includes various processes which test the condition of various components of the computer system. These BIOS processes are useful to one servicing a computer in the event of a failure. However, if the computer has problems which make it impossible to write the BIOS processes to main memory, the BIOS processes cannot be used in determining the nature of the problem. If these processes could somehow be made available in permanent memory on the memory bus, then even though the computer was otherwise inoperative, discovering the source of problems would be much easier.

SUMMARY OF THE INVENTION

The present invention is realized by a flash EEPROM memory array designed to be joined to a memory bus of a computer, diagnostic processes stored in the array for testing status of system to provide data indicating malfunctions in the computer, accessing processes stored in the array for calling the diagnostic processes even though the computer fails to boot, and communication processes stored in the array for transferring results produced by the diagnostic processes for use in servicing the computer.

One embodiment of the invention allows the transfer of data between hardware components of a computer and an external host computer so that a service technician at the host computer may diagnose and correct malfunctions within the computer which includes the flash EEPROM memory array.

The objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
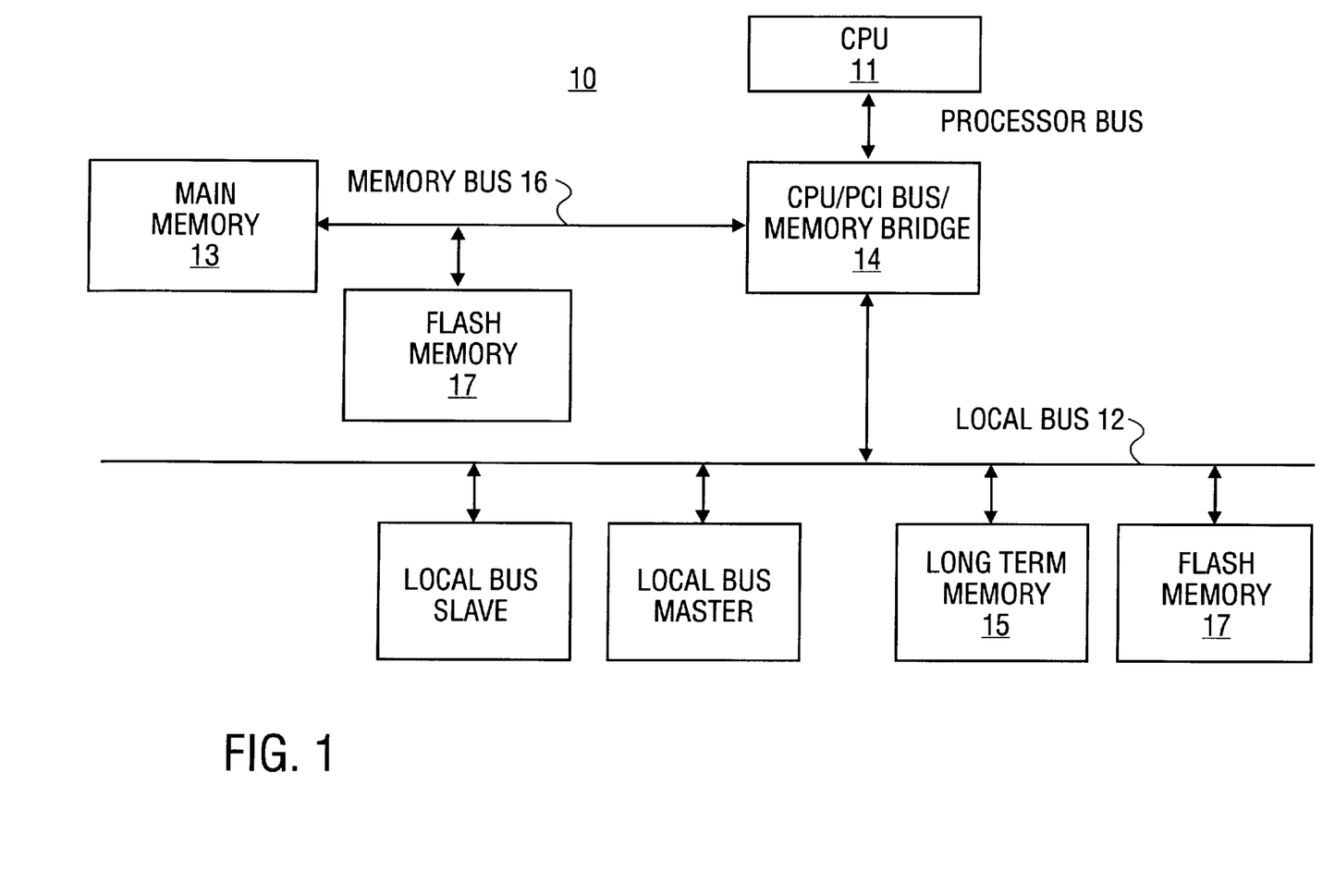
FIG. 1 is a block diagram of a computer system designed in accordance with the present invention.

Referring now to FIG. 1, there is illustrated a computer system 10 configured in accordance with one embodiment of the present invention. The system 10 illustrated includes a central processing unit 11 which executes the various instructions provided to control the operations of the system 10. The central processing unit 11 is typically joined by a processor bus to a bridge circuit 14 which controls access to an input/output bus 12 adapted to carry information between the various components of the system 10. In FIG. 1, the bus 12 is preferably a Peripheral Component Interface (PCI) bus or other local bus adapted to provide especially fast transfers of data. This bus is chosen in FIG. 1 for illustrative purposes only. In a typical system 10, various input/output devices are connected to the bus 12 as bus master and bus slave circuits. In the present illustration, for example, long term memory 15 may be joined to the PCI bus 12 as a bus master or a bus slave circuit. Other input/output devices such as sound boards, frame buffers, and the like may also be joined to the bus 12.

The bridge circuit 14 is also joined by a memory bus 16 to main memory 13. Main memory 13 is typically constructed of dynamic random access memory arranged in a manner well known to those skilled in the prior art to store information during a period in which power is provided to the system 10 although some systems may use other forms of random access memory such as static random access memory to accomplish the same purpose. In the present invention, a flash EEPROM memory array 17 designed in accordance with the present invention is also positioned on the memory bus 16 with main memory 13. A second flash EEPROM memory array 17 designed in accordance with the present invention is positioned on the bus 12 as well to demonstrate a second position.

As is known to those skilled in the art, writing to flash memory arrays is much slower than writing to DRAM memory because the current requirements are much higher and the process of writing and erasing is much more complicated than when writing to the typical DRAM memory. For this reason, flash memory has been considered to be unsuitable for storing programs and processes which involve frequent write operations. However, even though the write times are long compared to write times for DRAM, there are a number of reasons to use flash EEPROM memory arrays to supplement main memory.

One primary reason is to provide programs and processes which are immediately available for execution by the central processing unit when power is applied to a computer. If a flash EEPROM memory array is positioned on the memory bus so that it may be accessed as rapidly as the DRAM of main memory, and if an application program is placed in and made executable from the flash EEPROM memory array, then the application program need not be called from long term memory and placed in main memory in order to run. Similarly, if an executable application program stored in a flash EEPROM memory array positioned on a bus such as a PCI bus, the application may be run from the flash memory and need not be placed in main memory DRAM in order to run. This allows programs to begin functioning more rapidly and essentially eliminates page swapping for applications stored in the flash memory.

Various arrangements have been devised to allow flash memory storing a program to be placed on the memory bus. These arrangements obviate the slow writes and accompanying erases of the flash memory so that flash memory may be positioned on the memory bus without significant slowing of operations.

Some of these arrangements make use of the fact that most operations conducted on the code sectors of an application program are read operations; consequently, most lines of a program can be executed from flash memory at a rate as fast as they might be executed from DRAM. Write operations of data to program space in the flash memory are typically limited to operations which occur very infrequently. However, some processes do establish and modify data structures and variables stored within code sectors. For example, BIOS processes typically create data structures defining hardware elements of the computer system.

In one arrangement for allowing processes to be executed directly from flash memory positioned on the memory bus or on a local bus, the memory addresses assigned to the flash memory are designated as read and execute only. This allows an executable program stored in flash EEPROM memory array to be read and executed in a normal manner. However, if an attempt is made to write to the flash EEPROM memory array, an exception is generated because this area of the flash EEPROM memory array is read and execute only. A special exception handler is called which causes the memory management unit to read the page which includes the address to which the write was attempted and to write the data to DRAM memory. Once the page from the flash EEPROM memory array has been placed in DRAM memory, the page table for that portion of the program is updated so that accesses addressed to that portion of the program are now addressed to DRAM memory from which the program data may be read, written, and executed. Thus, the data in that portion of the program, whether data structures, variables, or self-modifying code, may be modified by writing to the page in DRAM main memory. In this manner, any program or process stored in a flash EEPROM memory array positioned on the memory bus or a local bus may run even though the program or process contains an area which must be written during operation.

The present invention makes use of such an arrangement which allows programs to be executed directly from flash memory to make the execution of BIOS programs which write various data structures feasible. If the flash memory is placed on the memory bus, processes may be accessed if operative DRAM memory exist even though the computer is inoperative. By storing the BIOS processes in flash memory positioned to supplement main memory DRAM on the memory bus, the BIOS processes may be accessed even though the computer system is unable to read data across the PCI and ISA buses. In fact, since the BIOS processes are in main memory when power is applied, they are immediately accessed. The invention allows the system test processes which are a part of the BIOS processes or any other test processes stored in flash memory to be used to determine the status of the system hardware. By providing various diagnostic and input/output processes, the invention allows hardware problems to be diagnosed and cured even though the operating system cannot be invoked. By supplementing the BIOS processes normally available, the invention provides the ability to furnish more hardware status data to a user (or via modem to a service technician) and allows a user (or technician) to manipulate the hardware of the system in order to diagnose and often overcome malfunctions.

Even though the flash memory containing these diagnostic processes is positioned on a local bus instead of on the memory bus such as the PCI bus, the executable diagnostic processes may still be accessed even though the computer system is unable to read data across the secondary bus so long as the path across the PCI bus remains intact.

The set of BIOS test routines provided with a computer system are typically designed to return values indicating the state of the components of the system which are normally used to set up the computer when it is started. Many of these values are only useful in diagnosing hardware problems to a technically skilled person and may be accessed only if special hardware is included in the computer. Even such a person may require additional diagnostic routines of substantial sophistication to give the values any diagnostic meaning. Because most users are insufficiently skilled to understand the results provided by a diagnostic program, most manufacturers do not provide diagnostic processes with the computers they sell. Consequently, the values generated by the BIOS processes are not very useful to most users in diagnosing hardware problems. In any case, the results produced by presently available BIOS test processes are not available if the system will not boot an operating system. This has made maintaining and repairing computers very expensive.

Typically manufacturers provide warranty service for from one to three years after purchase of a computer. A user calls a designated telephone number for service when a problem occurs with a machine under warranty. This usually starts a stumbling process by which a technician first determines the extent of the user's understanding and then talks the user through various steps to determine whatever facts are available. Often, the problem is not solved in this manner; and the user or a service technician must take the machine to a service facility for repair or have a technician make a housecall to fix the problem. The costs for service of this type have mounted with each improvement in the capabilities of personal computers.

In contrast to this, if diagnostic processes were to be available to a user as a part of the power-on initialization (POI) portion of the BIOS processes and if the BIOS test processes and these diagnostic processes could be run even though the system would not boot, then the user could convey this information to a technician and receive time and money saving instructions on how to correct a large number of hardware problems. In one embodiment of the present invention, the supplementary diagnostic processes run automatically if a failure occurs during start up and provide an indication to the user that a problem exists and the steps the user should take. These may include calling the service technician to explain the problem and the results shown by the diagnostic processes, or connecting to the service technician via a modem or network connection. The latter would allow a technician to run tests by means of such a connection using the diagnostic processes available on the machine with the problem and possibly curing the problem through the use of software processes available through the system used by the technician.

Figure 2:
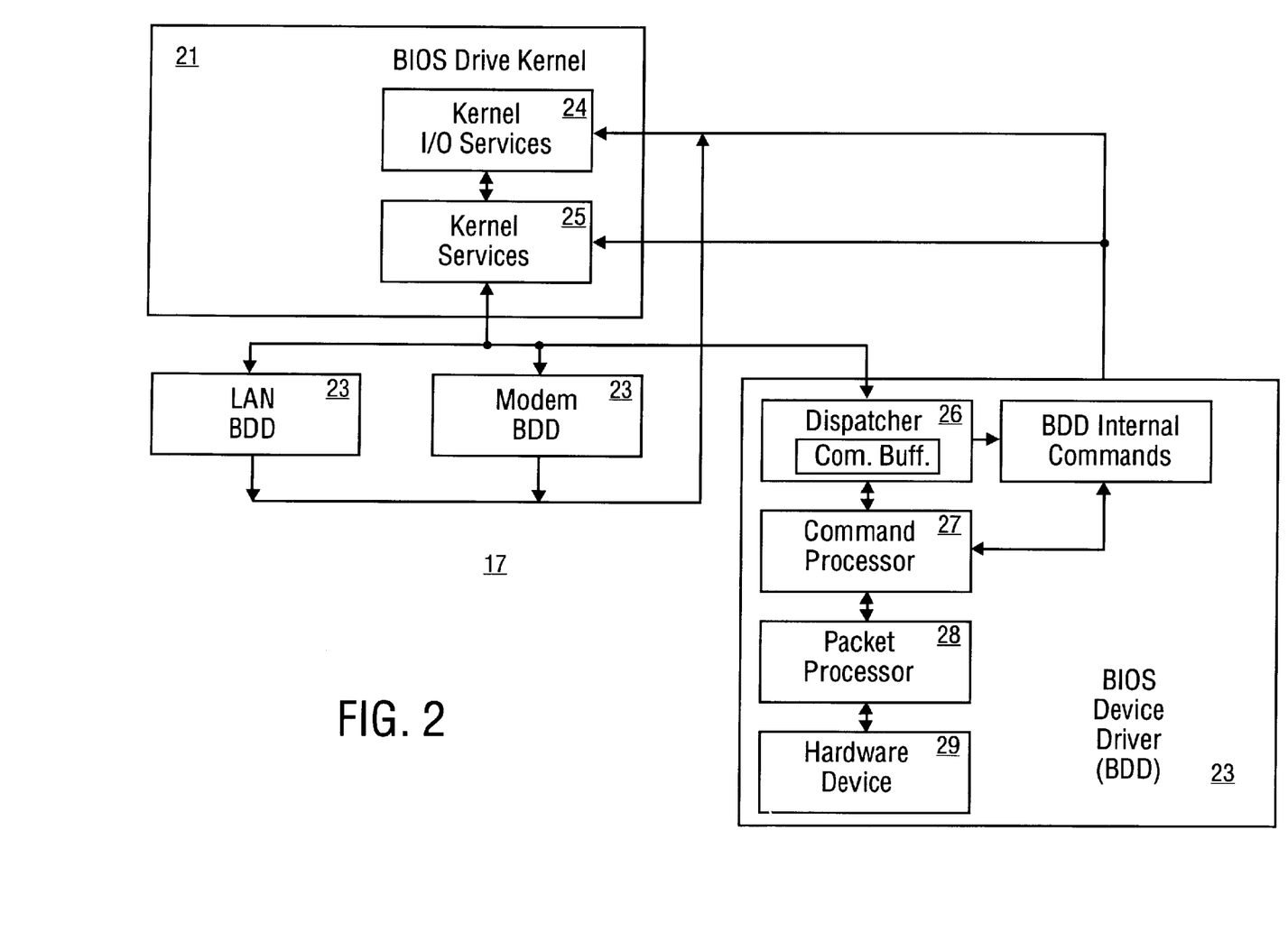
FIG. 2 is a diagram illustrating the functions of software processes designed in accordance with the present invention stored in a flash memory module used to supplement main memory in the system of FIG. 1.

FIG. 2 is a block diagram of a software system designed in accordance with the present invention. The system includes a BIOS driver kernel 21 and a plurality of BIOS device drivers 23 each of which is stored in flash EEPROM memory array (such as the array 17 shown in FIG. 1) on the memory bus of a computer. The kernel 21 and the drivers 23 may be a part of the BIOS functions stored in the flash memory or separate therefrom although stored in the same flash memory. The kernel 21 and each of the device drivers are adapted to function even though the operating system of the computer cannot be booted so that they may be used to diagnose and correct the functions of the computer. The manner in which the kernel and the device drivers function will be assisted by referring to FIG. 3 along with the description which follows.

When power is applied to the computer system, the BIOS processes stored in the flash memory are called; and the boot of the system begins. If the system functions correctly, the operating system is ultimately loaded; and the system is placed in operating condition. If the system does not boot, the BIOS and other diagnostic processes are available in flash memory on the memory bus and may be utilized in the absence of the typical operating system. In one particular embodiment, the BIOS diagnostic processes are invoked by a system boot failure and may indicate the failure to a user and suggest that the user call the diagnostic processes by selecting a screen option. In another embodiment, the BIOS diagnostic processes may indicate the failure to the user and automatically switch to and run the diagnostics processes in an attempt to fix the problem. In either case, the presence of the supplemented diagnostic processes in memory allows a user or a technician to operate diagnostic processes included in the flash memory for diagnosing hardware problems even though the system will not boot.

The kernel 21 has only a few very simple functions which it can carry out by itself. It may use kernel I/O services processes 24 to request keyboard, disk, or video input/output to allow a user to manipulate the system in the absence of these functions normally provided by the operating system. In one embodiment, these processes call the standard BIOS processes for accomplishing these functions. However, the main function of the kernel 21 is to provide a series of kernel service processes 25 which may be operated to provide services for the plurality of BIOS device drivers 23. In general, the kernel services processes 25 include processes which facilitate the transfer of data from which diagnoses may be made, both among the system components and external to the system.

Each BIOS device driver 23 (only one is shown in detail) is typically associated with a particular input/output hardware device 29. Such a driver is typically written by the manufacturer or service provider of the particular hardware device and contains processes for use with that hardware device. Each device driver 23 provides a dispatcher process 26 which furnishes a standard interface for interaction by the particular device driver 23 with the kernel services processes 25. The kernel services processes 25 may address a device driver 23 by directing a command to the dispatcher process 26. When functioning, one of the kernel services processes 25 polls in serial order the dispatcher processes 26 of each of the BIOS device drivers 23 which are provided to request commands from the drivers 23. A dispatcher process 26 responds to a request for a command from the kernel by providing commands for the kernel services processes 25 to execute. Each device driver 23 includes a limited set of functions which it may command the kernel 21 to execute. The dispatcher process 26 receives the command functions to execute from a command processor process 27. The command processor 27 translates commands furnished from an associated hardware device 29 into commands that the kernel services processes 25 understand so that the kernel may execute the limited set of commands available to it. The dispatcher process 26 transfers the commands into a command buffer accessible by the kernel. Typically such a buffer will be a data structure set up by the kernel in random access memory and identified by the calling parameters.

Each of the device drivers 23 also includes a packet processor 28 which communicates directly with the hardware device 29 and (depending on the device 29) receives packets from the hardware device 29 for transfer to the command processor 27. The packet processor 28 parses these packets and passes the data to the command processor 28. The command processor 28 translates the data into raw function commands and notifies the dispatcher 26 that a command is available. When the kernel services processes 25 poll the dispatcher 26 to determine whether that device driver 23 has a command to be executed, the dispatcher 26 loads the command buffer with the command and passes the command to the kernel for execution.

When the diagnostic kernel 21 is first accessed, the kernel service processes 25 set up data structures which include the addresses of the various low level services offered by the kernel through its I/O services processes, a database of the BIOS diagnostic drivers 23 which exist, and the addresses of the dispatchers 26 for the drivers 23. The kernel may also maintain data structures defining stacks and data areas for the transfer of commands and data. When the kernel services processes 25 are first invoked, a process causes the search of the data base of the BIOS diagnostic drivers 23 to determine which BIOS diagnostic drivers exist and the addresses of the dispatcher processes 26 for the drivers. Then, the kernel services processes 25 send an Initialize command to set up each device driver 23. In response to this Initialize command, each dispatcher 26 furnishes data defining the BIOS device driver 23 to the data structure maintained by the kernel services processes 25. This data may include the requirements of the BIOS device driver 23 for data, stack, code, and interrupts and may also include other data necessary for operating the BIOS device driver 23 and the associated hardware 29.

In response to the initialize command, the dispatcher process 26 may also cause the initialization of the hardware 29 (such as a modem) with which the BIOS device driver 23 is associated so that the hardware 29 may be operated.

Once initialization is complete, the kernel services processes 25 poll the dispatcher of each of the BIOS device drivers 23.

The kernel services processes 25 may also send a GetStatus command to each of the BIOS device drivers 23 to determine the status of the hardware 29 associated with the BIOS device driver 23. The GetStatus command causes the dispatcher 26 to determine the physical characteristics of the hardware 29 so that problems with the hardware may be discovered and data indicating the status returned to the kernel.

Each of the device drivers 23 may include internal diagnostic processes specially designed by a manufacturer or equipment supplier which may be initiated by a user to secure status data in response to a GetStatus command to assist in determining where a problem exists and how to resolve the problem. By selecting the kernel services processes 25, the user provides access to these diagnostic processes of each device driver 23. When a user uses the GetStatus command, the driver 23 uses these internal diagnostic processes to run extensive testing to determine malfunctions and to provide diagnostic suggestions. The diagnostic processes may also include processes which attempt to correct problems which are discovered.

The kernel services processes 25 may also send a Connect command to any of the BIOS device drivers 23 to cause the hardware 29 associated with a particular driver 23 to be connected to an external host. The connection process is typically isolated from the kernel and stored as special commands in a part of the BIOS device driver 23 shown as BDD internal commands in FIG. 2. When the dispatcher 26 for a modem device driver, for example, receives the connect command, it may run a process from the BDD internal processes which establishes a connection to a service technician at a host computer kept at the facilities of a manufacturer of a portion of the computer displaying problems in response to the diagnostic processes. In response to the attempted execution of a Connect command, the dispatcher 26 of the BIOS device driver 23 should return a value to the kernel indicating the results of the attempt such as: connection established, busy, device not present, connection timeout, or the like. This command allows the computer to be connected to a service technician who may then determine the problems which exist with the computer from some remote position.

To facilitate the use of such a connection, the kernel may send a PutDataStream command to cause a BIOS device driver 23 to transfer data to a host by modem or by LAN connection. A similar GetDataStream command from the kernel to a BIOS device driver 23 allows the kernel to get data from a BIOS device driver for transfer to some other portion of the computer system to correct malfunctions.

To assist such transfers, a BIOS device driver 23 may request the kernel to transfer system status data to the requesting BIOS device driver 23 through the use of a GetSystemStatus command directed to the kernel. Similarly a GetSystemInfo command directed to the kernel will cause the kernel to transfer system information to the requesting BIOS device driver 23. A PutString command from a BIOS device driver 23 causes the kernel I/O services processes 24 to send a string of data to a video terminal for display to a user. An Exit command to the kernel will initiate a process to prompt the user to reboot once the malfunction has been corrected.

Certain additional commands which the kernel may execute further assist in diagnosing and correcting system malfunctions. For example, a ReadSector command may be used to cause the kernel to read data from a storage drive for testing; and a WriteSector command may be used to replace data with data furnished from a host system or nonvolatile storage.

There are a number of possible processes which might be implemented using the system illustrated in FIG. 2. A typical process illustrated in FIG. 3 may proceed in the following manner. When power is applied to the system, the BIOS power-on initialization process is activated; and transfers execution to the diagnostics kernel to initiate a series of basic system tests. In one embodiment, these might be as simple as running the BIOS status tests which have been used historically. For example, the kernel may determine the amount of random access memory available, whether the memory is working, and whether code can be executed. Presuming that the system passes these tests, then the operating system is automatically booted; and the system operates.

Figure 3:
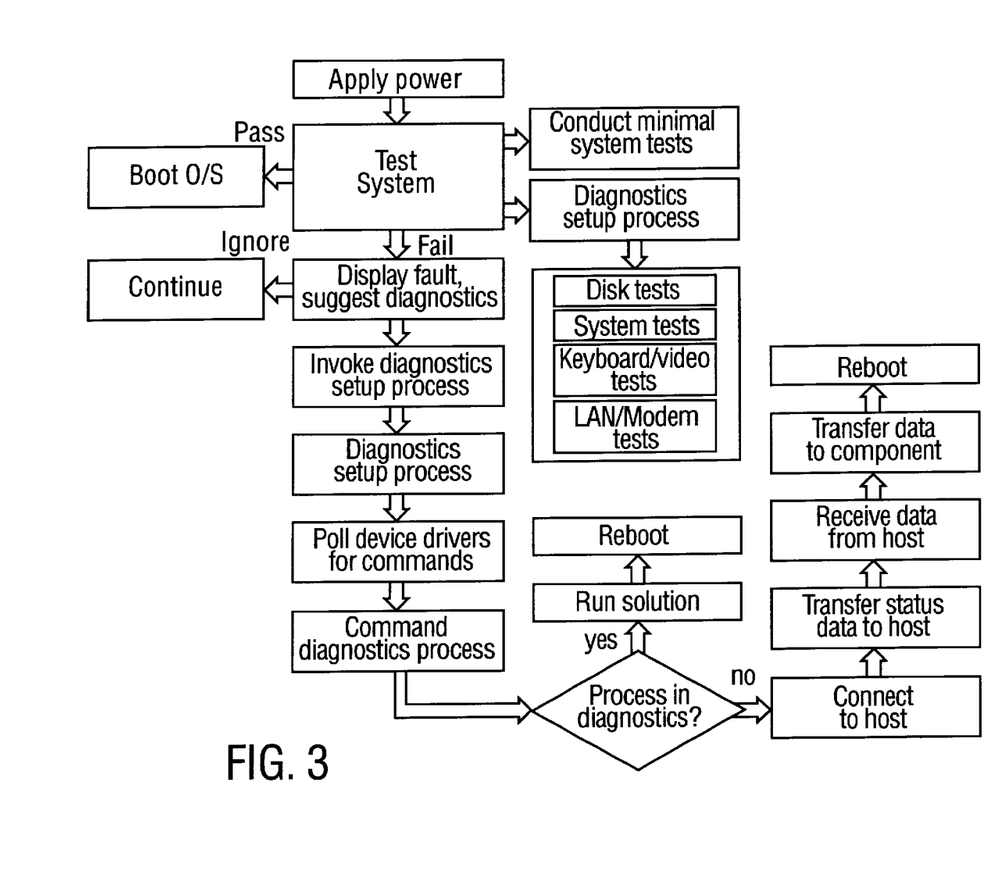
FIG. 3 is a flow chart illustrating a method in accordance with the invention.

The kernel services processes 25 may also, or alternatively, ask each of the hardware device drivers 23 to conduct a more extended set of diagnostic tests which return status values to assure that the various devices are functioning appropriately. For example, these tests may return the status of system settings and the various peripherals such as rotating disks, keyboard, video, network connections, and modems. The results of each set of diagnostic tests are logged as they occur. The kernel then passes to a next status determination and logs the results of that test. In a similar manner, if the devices 29 pass these tests, then the operating system is automatically booted; and the system operates.

Figure 4:
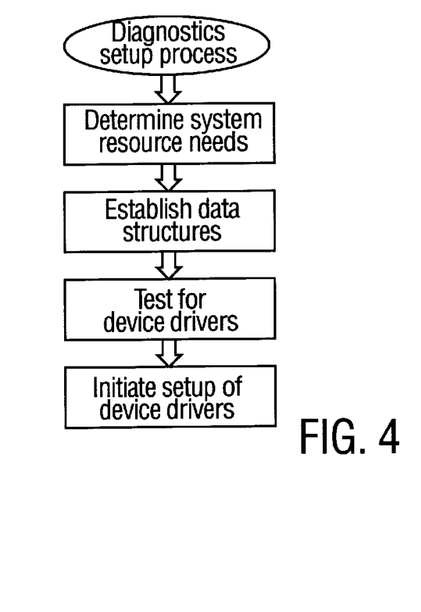
FIG. 4 is a flow chart illustrating details of steps in the method of FIG. 3.

Before the kernel services processes 25 can cause the device drivers 23 to run any diagnostic processes, a series of operations are conducted in the manner shown in FIG. 4. The kernel services processes 25 first determine what system resources are available and what each device driver 23 requires to conduct its tests. For example, a particular driver 23 may require two megabytes of random access memory while another requires a single megabyte of memory. After determining the extent of resources available, the kernel services processes 25 set up the data structures mentioned above such as those in which I/O services, device drivers, and dispatcher addresses are recorded. Then the addresses of the dispatcher processes 26 of the drivers 23 are determined, and each of the drivers 23 is initialized. The kernel services processes 25 then poll the drivers 23 sequentially to receive commands. At this point the kernel services processes 25 may send a GetStatus command to the drivers 23 to initiate processes to determine the status of the associated devices 29.

If the device drivers 23 are enabled to determine the device status and the devices 29 pass these tests, then the operating system is automatically booted; and the system operates.

If the system fails any of these initial tests, the particular driver 23 may direct the kernel to display a message explaining the failure, possibly suggesting solutions to the problem, and asking if the user wants to attempt to fix the problem. For example, one of the device drivers 23 may be designed to conduct tests to determine the status of an electromechanical hard disk drive. This device driver 23 may execute various basic diagnostic routines including reading the master partition table. In reading the partition table, the driver 23 may determine that an entry has been corrupted. The device driver 23 responds to this determination by directing the kernel I/O services processes 24 to indicate the problem to the viewer and possibly suggests solutions.

If a user selects the suggestion that an attempt to fix the drive be made, the kernel invokes the diagnostic setup program a second time. After the setup program has been run, the kernel services processes 25 may direct each of the device drivers 23 to conduct more extensive tests of system devices to determine in detail the condition of the associated hardware device. The particular processes run by the device drivers 23 will depend of the specific implementation provided by the manufacturer.

The results of these more extensive tests might produce a number of different results. For example, the driver might cause the kernel to print on the display, "Disk drive failure. Would you like to attempt to fix?" A "no" answer would cause an exit from the diagnostics processes. A "yes" answer might cause the driver to run a process which might then offer the user the option of shutting down the computer and replacing the operating system from an archived copy.

Other diagnostic processes might offer a user the option of going online with a software manufacturer to have various software replaced. If such an option were to be selected, the particular driver would call the kernel to run the Connect command to connect to the operating system manufacturer using data stored in the device driver for the modem. Once the connection were made to the manufacturer, a technician could utilize the various commands available to the kernel and to the device drivers to interrogate the hard drive and determine the problem with the operating system. For example, a technician might look at a drive using the ReadSector commands of the driver, and then transfer data read back to the host using the PutDataStream command. When the corrupted portion of a drive had been located, a corrected version might be placed in the drive using the GetDataStream command which allows the kernel to get data from a BIOS device driver for transfer to the drive. The WriteSector command to the kernel would then place the new version of the software in the drive. Again the operation would be completed by an Exit command to the kernel causing the display to ask for a reboot. It should be noted that this facility could be used to update and replace versions of the diagnostic processes in each of the device drivers 23.

Other operations may be devised which would function in a similar manner to assist in the diagnosing and repair of a computer system. For example, the diagnostic processes might be made available through the operating system as well as in the pre-operating system phase of operation. This would reduce the need to store redundant processes for diagnosing and repairing the computer. The ability to write to the diagnostic processes allows the individual diagnostic drivers to be updated individually and online if that facility is desired.

Although the present invention has been described in terms of a preferred embodiment, it will be appreciated that various modifications and alterations might be made by those skilled in the art without departing from the spirit and scope of the invention. For example, it would be possible to provide the functions of the diagnostic kernel utilizing hardware or firmware accessible to a user even though a computer would not boot. Moreover, other types of non-volatile memory arrays in addition to flash EEPROM memory arrays might be utilized in practicing the invention. The invention should therefore be measured in terms of the claims which follow.

What is claimed is:

1. In a computer system in which a system boot failure occurs, a method comprising:
    invoking a diagnostic setup process in response to the system boot failure;
    performing the diagnostics setup process, the diagnostics setup process being performed by a software system stored in the flash memory of the computer system, the diagnostic setup process including:
        basic input/ouput processes stored in a main memory of the computer system;
        a system test process stored in a flash memory of the computer system;
        a device driver stored in a flash memory of the computer system;
        wherein said system test process and said device driver are adapted to function even though the operating system of the computer cannot be booted, wherein the main memory is coupled to a memory bus, and wherein the flash memory is coupled to one of the memory bus and a local bus;
    polling said device driver for available commands;
    determining a cause of the system boot failure; and
    providing an indication to a user that a problem exists.

2. The method of claim 1, wherein the flash memory is a flash electrically erasable read only memory (EEPROM) memory array.

3. The method of claim 1, wherein performing the diagnostics setup process further comprises:
    invoking the system test process to diagnose and correct functions of the computer system, the system test process to also determine system resource needs;
    establishing data structures defining hardware elements of the computer system;
    determining an address of a dispatcher process associated with the device driver; and
    initializing the device driver.

4. The method of claim 1, wherein determining a cause of the system boot failure further comprises:
    invoking additional processes which attempt to correct detected problems.

5. The computer system of claim 1, wherein the main memory is coupled to a memory bus.

6. The computer system of claim 1 wherein the flash memory is coupled to one of the memory bus or a local bus.

7. The computer system of claim 1, wherein the method further comprises:
    providing an indication to a user that a problem exists.

8. A machine-readable medium having stored thereon a set of instructions, said set of instructions, when executed by a processor in a computer system in which a system boot failure occurs, to cause said processor to perform a method, comprising:
    invoking a diagnostic setup process in response to the system boot failure;
    performing the diagnostics setup process, the diagnostics setup process being performed by a software system stored in the flash memory of the computer system, the diagnostic setup process including basic input/ouput processes stored in a main memory of the computer system, a system test process stored in a flash memory of the computer system, and a device driver stored in a flash memory of the computer system, wherein said system test process and said device driver are adapted to function even though the operating system of the computer cannot be booted, wherein the main memory is coupled to a memory bus, and wherein the flash memory is coupled to one of the memory bus or a local bus;
    polling said device driver for available commands;
    determining a cause of the system boot failure; and
    providing an indication to a user that a problem exists.

9. The machine-readable medium of claim 8, further comprising instructions, which when executed by the processor in response to a system boot failure, cause the processor to perform a method further comprising:
    invoking the system test process to diagnose and correct functions of the computer system, the system test process to determine system resource needs;
    establishing data structures defining hardware elements of the computer system;
    determining an address of a dispatcher process associated with the device driver; and
    initializing the device driver.

10. A computer system, comprising:
    a processor;
    a memory bus coupled with the processor;
    an input device coupled with the processor;
    a main memory coupled to the memory bus, the main memory to store a diagnostic setup process, the diagnostic setup process including basic input/output (BIOS) processes; and
    a flash memory coupled to the memory bus, the flash memory to store a system test process and a device driver, the system test process and the device driver enabled to be executed from said flash memory in response to a system boot failure of the computer system, wherein the system test process and the device driver are adapted to function even though the operating system of the computer cannot be booted.

11. The computer system of claim 10, further comprising:
    a display device coupled with the processor to display an indication to a user that a problem has been detected.

12. The computer system of claim 10, wherein the system test process is in communication with the device driver.

13. A computer system, comprising:
    a processor coupled to a bus bridge through a processor bus within the computer system;
    a main memory to store basic input/output processes, the main memory coupled to the bus bridge through the memory bus;

a local bus coupled to the bus bridge;

a plurality of bus master components coupled to the local bus;

a flash memory coupled to the local bus, flash memory including a system test process enabled to executed from said flash memory in response to a system boot failure within the computer system;

a device driver to control an operation of a first component device coupled to the computer system, the device driver to be stored in the flash memory and enabled to be executed from the flash memory in response to a system boot failure within the computer system, wherein the device driver provides communication with the first component device;

a kernel process to provide communication with the device driver, the kernel process to be stored in the flash memory and enabled to be executed from the flash memory in response to a system boot failure within the computer system;

wherein the system test process and the device driver are adapted to function even though an operating system of the computer cannot be booted.

14. The computer system of claim 13, wherein the local bus is a peripheral component interface (PCI) bus.

15. The computer system of claim 13, wherein the flash memory is a flash electrically erasable read only memory (EEPROM) array.

* * * * *

UNITED STATES PATENT AND TRADEMARK OFFICE
CERTIFICATE OF CORRECTION

PATENT NO. : 6,449,735 B1
DATED : September 10, 2002
INVENTOR(S) : Edwards et al.

It is certified that error appears in the above-identified patent and that said Letters Patent is hereby corrected as shown below:

Column 4,
Line 2, delete "Interface", insert -- Interconnect --.

Column 11,
Line 45, delete "memory array".

Signed and Sealed this

Fifteenth Day of April, 2003

JAMES E. ROGAN
*Director of the United States Patent and Trademark Office*